United States Patent

[11] 3,586,902

[72] Inventor Emil Siegel
Darmstadt-Arheilgen, Germany
[21] Appl. No. 844,750
[22] Filed July 25, 1969
[45] Patented June 22, 1971
[73] Assignee Fernseh G.m.b.H.
Darmstadt, Germany
[32] Priority July 30, 1968
[33] Germany
[31] P 17 62 656.1

[54] VERTICAL DEFLECTION ARRANGEMENT IN A COLOR TELEVISION SYSTEM
6 Claims, 1 Drawing Fig.

[52] U.S. Cl. .......... 315/26, 315/13 C, 315/27 GD
[51] Int. Cl. .......... H01j 29/76
[50] Field of Search .......... 315/13 C, 26, 27 GDC, 27 SR

[56] References Cited
UNITED STATES PATENTS
3,192,433 6/1965 Schneider .......... 315/27 GD
3,307,067 2/1967 Jachim et al. .......... 315/13 C

*Primary Examiner*—Rodney D. Bennett, Jr.
*Assistant Examiner*—Brian L. Ribando
*Attorney*—Michael S. Striker

ABSTRACT: The vertical deflection coils in a color television system are series connected. Corrective deflection fields are supplied by auxiliary windings, each made of much thinner wire than the corresponding deflection coil. Correction currents are supplied separately to each auxiliary winding. A resistor in series with the series-connected vertical deflection coils serves to supply a feedback voltage to the input of the sawtooth current generator energizing vertical deflection coils.

PATENTED JUN 22 1971
3,586,902
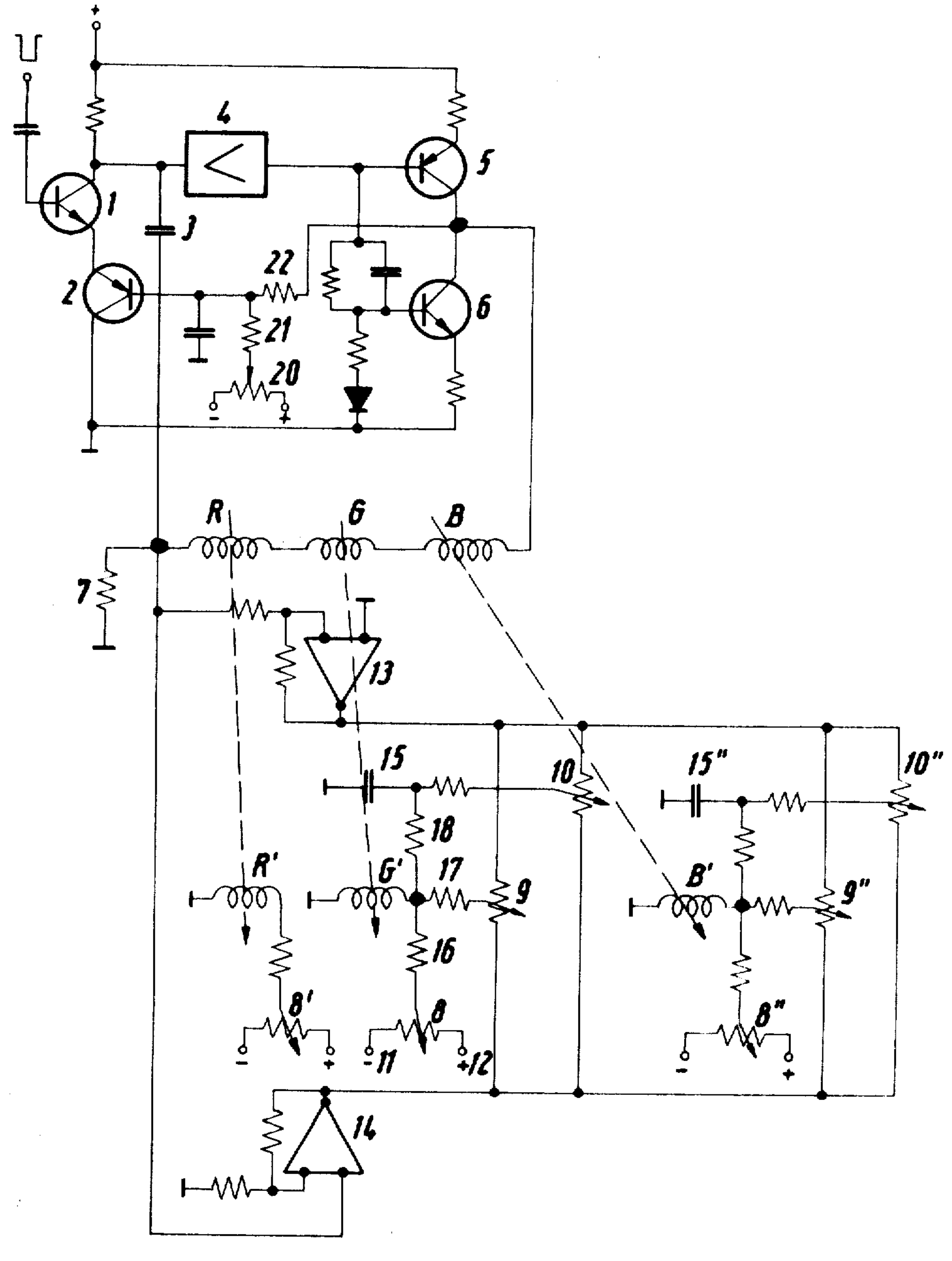
Inventor:
Emil Siegel
by Michael S. Striker
Attorney

VERTICAL DEFLECTION ARRANGEMENT IN A COLOR TELEVISION SYSTEM

BACKGROUND OF THE INVENTION

The vertical deflection coils of the pickup or scanning tubes in, respectively, color television cameras and color film scanners are generally connected in series, in order to decrease the effect of different heating of the deflection coils on the deflection current. However, the series connection results in the difficulty that relatively complicated auxiliary arrangements are required in order to accomplish the proper superposition of the rasters. In known systems, additional coils may be furnished for the deflection arrangement, and these coils supplied with direct currents in order to achieve a corresponding translation of the image. Use of such additional coils results in considerable added expense. Furthermore, it can easily happen that the raster geometry achieved by the auxiliary coils does not coincide with that of the main deflection coils, thus leading to poor superposition of the rasters. Another solution for achieving a superposition of the rasters consists in the proposal to shunt each of the deflection coils, thus decreasing the sawtooth deflection current by adjustable amounts, or changing the waveform thereof. However, this method only partially serves the purpose. Furthermore, the resulting raster coincidence is not stable with temperature, as soon as the temperature coefficient of the deflection coil and the corresponding shunt are not the same. Also it is difficult to furnish the direct currents required for the translation of the image into the deflection coils.

SUMMARY OF THE INVENTION

It is the objective of the present invention to overcome the above-mentioned drawbacks.

The invention comprises an arrangement for use in a color television camera or in a color film scanner having series-connected vertical deflection coils. It comprises a plurality of auxiliary windings, each associated with a corresponding deflection coil and wound in a bifilar fashion therewith. Means are provided for furnishing correction currents separately for each of the auxiliary windings. Thus the correction currents either for translation of the image or for amplitude correction or linearity correction may be separately applied to each auxiliary winding. This arrangement has the advantage that the deflection coils may be wound in the usual manner and the total space required for both windings, namely the auxiliary winding and the deflection coil in each case, is not much greater than that required for the corresponding deflection coil alone. This is especially true, if, as in a preferred embodiment of this invention, the bifilar auxiliary windings are made of substantially thinner wire than the deflection coils. Such a substantially thinner wire may be accommodated without an increase in the volume of the windings. The arrangement has the further advantage that each auxiliary winding may be furnished with independent correction currents, thus permitting a complete raster coincidence.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a schematic diagram showing the circuit arrangement of a preferred embodiment, in accordance with the present invention.

DESCRIPTION OF THE PREFERRED EMBODIMENTS

The preferred embodiment of this invention will now be described with reference to the FIGURE.

The vertical deflection signal generator shown in the FIGURE is of a conventional type, wherein a transistor 1 is used as a switch for timing the discharge of a storage condenser 3 which serves as a source of sawtooth voltage. The sawtooth voltage is used to drive an output stage, having transistors 5 and 6, via an amplifier 4. The output of amplifier 4, specifically, is applied to the base of transistor 5 whose emitter is connected to the positive voltage supply via an unspecified resistor and whose collector is connected to the collector of transistor 6. Further, the output of amplifier 4 is connected to the base of transistor 6 by means of a resistor and capacitor connected in parallel. The base of transistor 6 is further connected to the negative supply terminal, or ground, by means of a resistance-diode series circuit. A corrective DC component may be applied to the common point of the collector of the transistor 5 and the collector of transistor 6 for joint translation of the rasters in a vertical direction by means of a potentiometer 20 connected across an auxiliary voltage source and connected to the common point of the collector of transistor 5 and the collector of transistor 6 by means of a resistor 21 and 22. The arrangement constitutes, in conjunction with the feedback signal supplied as described below, a sawtooth current generator of high internal impedance. The vertical deflection coils corresponding to the colors red, green, and blue are series connected. One terminal of the series connection is connected to the common point of the collectors of transistors 5 and 6, while the other terminal is connected, via a resistance 7, to ground. The feedback signal for the sawtooth current generator, as mentioned above, is derived from the resistor 7 and applied to the input of amplifier 4. The auxiliary windings R', G', and B' each correspond to one of the main deflection coils R, G, and B. They are wound, during the manufacturing process, simultaneously with the windings R, G, and B and constitute bifilar windings. The auxiliary windings thus have a close inductive relationship with the deflection coils.

The means for supplying the correction currents separately for each auxiliary winding will now be described. These may constitute identical circuits as in the present embodiment. As an illustration, the circuit associated with the auxiliary winding G' will be described. It comprises three potentiometers 8, 9, and 10 furnishing DC current for correction of the vertical position of the image, sawtooth currents for affecting the amplitude of the sawtooth currents and parabolic currents for controlling the linearity. The DC currents are furnished by means of a DC voltage source having terminals 11 and 12 to which are connected the ends of the potentiometer 8. The potentiometer 9 is fed by sawtooth voltages which are derived from resistor 7 and are converted into push-pull sawtooth voltages by means of amplifiers 13 and 14. The same push-pull signal also furnishes the parabolic current as follows. The push-pull sawtooth voltage is applied to the ends of potentiometer 10, the voltage at whose variable arm is integrated by means of capacitor 15. Decoupling between the three potentiometers 8, 9, 10 is effected by means of high resistors 16, 17 and 18. If, as in the present embodiment, only three deflection coils, here for a red, green, blue color camera, are required, it is sufficient to feed only two of the auxiliary coils with the adjustable correction currents. However, the third auxiliary winding, which is the winding R' in the embodiment shown in the FIGURE may be supplied with a control potentiometer 8' for introduction of a direct current component.

As mentioned above, a joint regulation of the position of the rastors in the vertical direction is accomplished by furnishing a direct current component simultaneously to all three deflection coils as shown by potentiometer 20 and resistors 21 and 22.

While the invention has been illustrated and described as embodied in a particular type of color television signal transmitter, it is not intended to be limited to the details shown, since various modification and circuit changes may be made without departing in any way from the spirit of the present invention.

What is claimed as new and desired to be protected by Letters Patent is set forth in the appended claims.

I claim:

1. In the pickup tubes of a color television system, a vertical deflection system, comprising, in combination, a plurality of series-connected vertical deflection coils, each furnishing a vertical deflection field for one of said pickup tubes; a corresponding plurality of auxiliary windings, each wound in a bifilar relationship to a corresponding vertical deflection coil; and means for furnishing correction currents separately to each of said auxiliary windings, whereby corrective magnetic fields may be superimposed upon the associated vertical deflection fields.

2. A system as set forth in claim 1, wherein said means for furnishing correction currents separately to each of said auxiliary windings comprise means for furnishing adjustable correction currents separately for each of said auxiliary windings.

3. A system as set forth in claim 2, wherein said corrective magnetic fields comprise both unidirectional alternating magnetic fields.

4. A system as set forth in claim 1, wherein each of said vertical deflection coils is wound on a coil form; and wherein said auxiliary windings are made of wire which is substantially thinner than the wire constituting said vertical deflection coils, whereby said coil forms may remain substantially unchanged despite the addition of said auxiliary windings.

5. A system as set forth in claim 1, wherein said series-connected vertical deflection coils together have an associated series impedance; further comprising an energizing circuit for energizing said series-connected vertical deflection coils, said energizing circuit having a high internal impedance relative to said associated series impedance.

6. A system as set forth in claim 5, further comprising a resistance connected in series to said series-connected vertical deflection coils; wherein said energizing circuits supplies a sawtooth current to said series-connected resistance and vertical deflection coils, thereby causing a sawtooth voltage to appear across said resistance; and feedback circuit means for coupling said sawtooth voltage to the input of said energizing circuit.